May 19, 1970　　TAKASHI WATANABE　　3,512,457
METHOD AND APPARATUS OF MAKING BAGS OF THERMOPLASTIC
FILM HAVING INTEGRAL SEALABLE FLAPS
Filed March 1, 1968　　　　　　　　　　　　2 Sheets-Sheet 2
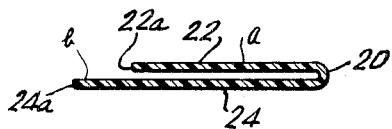
Fig. 5
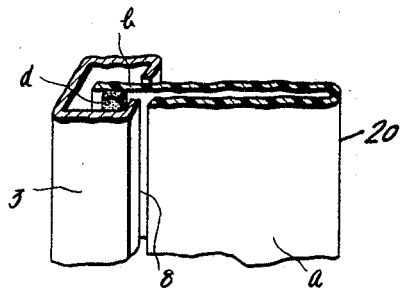
Fig. 4
Fig. 3
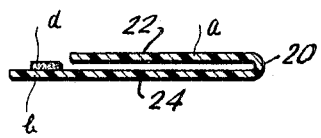
Fig. 6
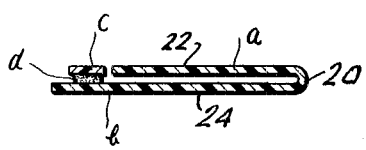
Fig. 7
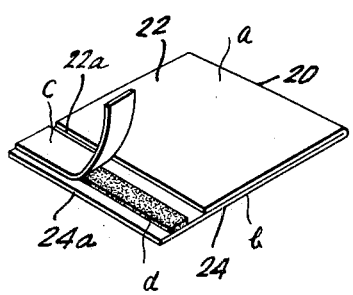
Fig. 8
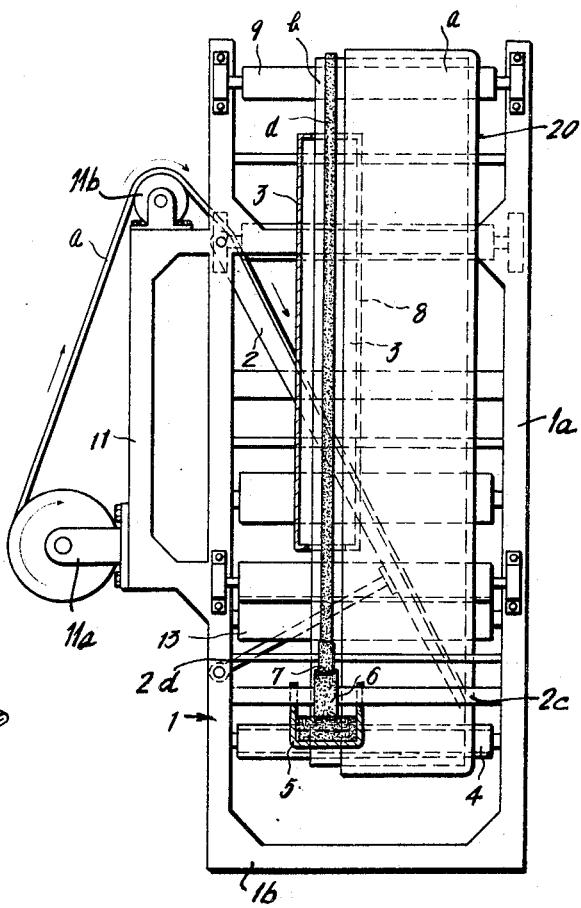
INVENTOR
TAKASHI WATANABE
BY
Mathew Toren
ATTORNEYS United States Patent Office 3,512,457
Patented May 19, 1970

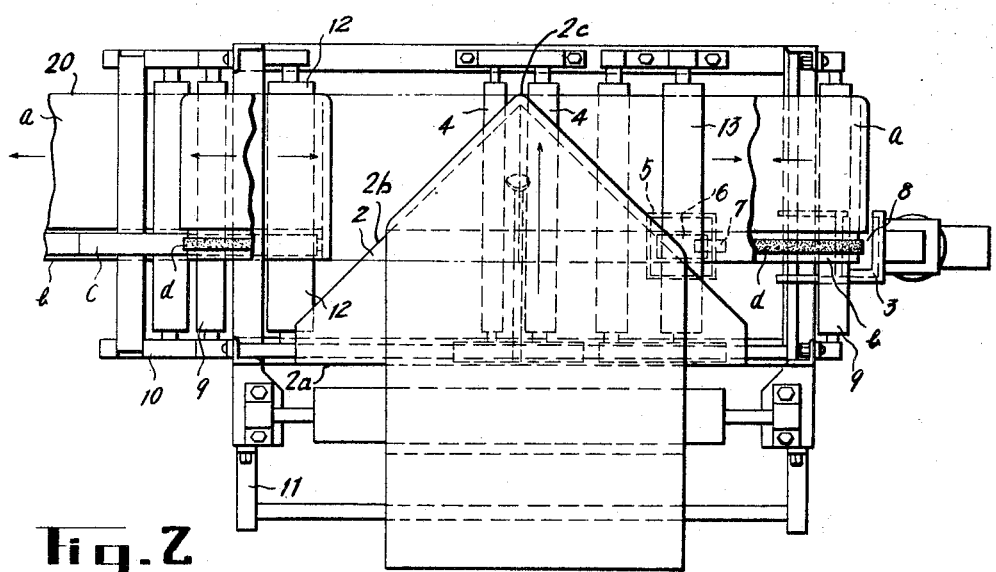

3,512,457
METHOD AND APPARATUS OF MAKING BAGS OF THERMOPLASTIC FILM HAVING INTEGRAL SEALABLE FLAPS
Takashi Watanabe, Tokyo, Japan, assignor to Tohcello-Shoji Kaisha Co., Ltd., Tokyo, Japan
Filed Mar. 1, 1968, Ser. No. 709,712
Claims priority, application Japan, Oct. 13, 1967, 42/65,614
Int. Cl. B31b 1/00
U.S. Cl. 93—8    4 Claims

ABSTRACT OF THE DISCLOSURE

A device for manufacturing bags from a continuous longitudinally extending sheet of thermoplastic resin film, the device is formed of a frame member, and means for passing the sheet of film over the frame through the various parts which transform the film into a bag having a sealable flap. Initially the sheet of film is passed downwardly over a plate member having converging sides which meet at an apex at the lower end of the plate, as as the film passes over the plate it is caused to fold over upon itself and the folding is completed as the film passes between a pair of rollers. The film is folded along a longitudinal fold line with one section overlapping the other so that the edge of one section extends outwardly from the edge of the other forming a strip along the edge which is not in contact with the other section. After folding, the strip along one section of the film is coated with a narrow band of pressure sensitive binder material and the film is passed through a drying chamber for a sufficient length to assure that it is completely dried. Next, the film is passed over a roller along with a narrow width of pressure adhering tape which is superimposed on the band of pressure sensitive binder material. As it completes its passage over the frame of the device the folded over sheet of film is welded at spaced locations along lines arranged transversely to the longitudinal path of travel. The sheet of film is then cut along the welded lines forming individual bags. The outstanding strip located along one section of the film forms a sealable flap by removing the tape from the band of binder material. As long as the tape is retained in place adjoining bags will not become attached to one another.

---

A method of manufacturing bags from a continuous, longitudinally extending sheet of a thermoplastic resin film comprising the steps of passing the film along a longitulinal path of travel, folding the film along a longitudinally extending fold line so that one section overlaps upon the other providing one edge strip extending outwardly from the other, continuously applying a longitudinally extending band of pressure-sensitive binder material along the edge strip, drying the binder material, and then superimposing a removable pressure-adhering tape on the band of binder material, finally welding the folded over sections of film together at spaced locations along lines disposed substantially perpendicular to the path of travel of the film and cutting the film along these welded lines for forming individual bags.

A resealable bag formed of thermoplastic film comprising a first section folded over along a fold line upon a second section of the bag, the first section of the film extending beyond the edge of the second section of the film and forming a flap, a band of pressure-sensitive binder material disposed on the flap in parallel relationship with the fold line between the sections, the band of pressure sensitive binder material applied to the surface of the flap facing toward the other section of the film, a strip of removable pressure adhering tape superimposed on the band of pressure sensitive binder material, and the edges of the first and second sections, which are arranged substantially at right angles to fold line, are welded together, whereby a bag is formed with the strip on the first section forming a flap which can be folded over upon the second section and sealed thereto by removing the pressure adhering tape.

SUMMARY OF THE INVENTION

The present invention is directed to a method of and apparatus for manufacturing bags from thermoplastic resin film and also to the construction of the bag itself. More particularly, the invention concerns a bag having a sealable flap which is formed by longitudinally folding a sheet of thermoplastic film over upon itself so that a narrow strip remains along one edge which subsequently acts as the flap.

The primary object of the present invention is to form a bag of a thermoplastic film having an integral sealable flap.

Another object of the invention is to provide a simple method for folding a longitudinally extending sheet of thermoplastc film and transforming it into bags having a sealable flap.

Still, another object of the invention is to provide an arrangement for applying a pressure sensitive binder material to the flap of the bag.

Yet, another object of the invention is to superimpose a strip of removable pressure adhering tape on the pressure sensitive binder material to prevent sticking of the binder material during the storage period prior to use of the bag.

A further object of the invention is to provide an easily constructed mass produced thermoplastic film bag having a resealable flap.

Accordingly, a longitudinally extending sheet of thermoplastic resin film is folded over upon itself along a longitudinally extending fold line to provide two sections facing each other. One of the sections is wider than the other and forms a strip extending outwardly from the edge of the outer section. A band of pressure sensitive binder material is applied to the outwardly extending strip in the longitudinal directon and then the film is passed through a drying chamber to assure that the binder material is dried. Subsequently, a strip of removable pressure adhering tape is superimposed upon the band of binder material and the tape is of a sufficient width to cover the band of binder material completely. Finally, the folded sheet of film is welded together along lines disposed transversely to the longitudinal axis of the sheet and the sheet is cut along these lines to furnish individual bags. The strip outstanding out from one section of the sheet forms a flap for the individual bag which, upon removing the pressure adhering tape, may be sealed by folding it over upon the other section and applying pressure so that the binder material will adhere. Additionally, the binder material permits the flap to be opened and resealed so that the bag can be reused a number of times and it can be resealed after each use.

Since the pressure adhering tape completely covers the binder material it provides a removable cover which prevents the individual bags from adhering together prior to use. The pressure adhering tape is easily removable and does not affect the sealing ability of the binder material.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a front elevation view, partially broken away, showing an apparatus embodying the present invention;

FIG. 2 is a top plan view of the apparatus shown in FIG. 1;

FIG. 3 is a side view, partially broken away, of the apparatus illustrated in FIG. 1;

FIG. 4 is an enlarged detail view shown in perspective of the section taken along line X—X in FIG. 1;

FIG. 5 is an enlarged detail view shown in section and taken along line A—A in FIG. 1;

FIG. 6 is an enlarged detail view shown in section and taken along line B—B in FIG. 1.

FIG. 7 is an enlarged detail view shown in section and taken along line C—C; and FIG. 8 is a perspective view of an article formed by the apparatus shown in FIGS. 1 to 4.

DETAILED DESCRIPTION OF THE INVENTION

In FIGS. 1, 2 and 3 a frame member 1 is shown comprised of a plurality of upright members 1a and transverse members 1b extending between and interconnecting the upright members. Mounted on the back of the frame 1 is a support bracket 11 which has a roller bracket 11a located at its lower end. The roller bracket 11a is arranged to receive a roll of thermoplastic resin film a. As shown in FIG. 3 the thermoplastic film a passes upwardly from the roller bracket 11a to a roller 11b located at the upper end of the bracket 11.

Adjacent the roller 11b is a plate member 2 which is secured at its upper end to the frame 1 and extends downward at an angle to the vertical from the upper rear side to the lower front side of the frame. At its upper edge 2a the plate member 2 is of a full width, however, its side edges 2b converge downwardly and meet at an apex 2c at the lower end of the plate member, see FIGS. 1 and 2. The plate member due to its converging sides 2a has the general form of an isosceles triangle with an acute angle formed at the apex 2c. The lower end of the plate member 2 is supported by a rod member 2d extending from the lower rear portion of the frame 1 to a position at the lower part of the plate member 2.

Aligned below the apex 2c of the plate member and mounted on the frame 1 are a pair of horizontally arranged rollers 4, 4 disposed substatnially perpendicularly to the front of the frame. To the right of rollers 4, 4, as viewed in FIG. 1, is a support roller 4a which is secured to the frame 1. Positioned along side the support roller 4a is a reservoir 5 containing binder material d, i.e. a synthetic resin paste containing diluents such as acetone, ethyl acetate, and the like. A horizontally arranged transfer roller 6 is supported above the reservoir 5 so that a portion of its peripheral circumference passes through the reservoir as it is rotated picking up a certain amount of the binder material. At the upper edge of the reservoir a doctor blade 14 is positioned in contact with the peripheral circumference of the roller 6 for regulating the amount of binder material it withdraws. Above the roller 6 is an applicator roller 7 which is supported by arms 7a from the upright members 1a of the frame. The roller 7 under the effect of gravity is maintained in surface contact with the peripheral circumference of the roller 6. As the roller 6 rotates picking up binder material in the reservoir 5 it transfers the binder material to the applicator roller 7. Opposite the roller 7 and acting in combination with it is a horizontally disposed pressure roller 13. Closely spaced above and to the right of the roller 13, as shown in FIG. 1, is one of a number of support rollers 9 mounted on the outer surfaces of the upright members 1a of the frame 1.

Secured to the uprights 1a of the frame is a drying chamber 3 which extends from just above the roller 9 to just below the upper end of the frame 1. As shown in FIG. 4 the drying chamber has a C-shaped transverse cross section with a narrow slot 8 forming the opening in the C-shaped section. Positioned along side the frame and below the drying chamber is a blower 16, a heater 15 and a conduit 17 which extends upwardly from the heater to the lower end of the drying chamber 3.

On each side of frame at its upper end is a support roller 9 and on the left side as shown in FIG. 1, another support roller 9 is spaced below the upper one. Disposed below the rollers 9 on the left side is a support bracket 10 extending outwardly from the frame which supports a roll of pressure adhering tape c. Below the bracket 10 and on the inner face of the same upright 1a of the frame is a pressure roller 12 arranged in the horizontal direction. Opposite the pressure roller 12 on the outer side of the upright 1a are a pair of closely spaced rollers 18 mounted on a bracket 18a. Spaced below these rollers is a side welder-cutter 19. The arrangement of the weldercutter 19 is shown schematically since such a device is well known in the art and its details do not form any part of the invention.

In operating the apparatus described and in performing the method of the present invention a sheet of thermoplastic resin film a is withdrawn from the roll mounted in the roller support 11a and is transported upwardly over the roll 11b and then downwardly within the frame 1 passing downwardly over the plate member 2. The path of travel of the film a is shown by arrows in FIGS. 1, 2 and 3. Due to the angular disposition of the plate member 2 and the converging arrangement of its side edges 2b the sheet is caused to fold over upon itself as it passes downwardly. It will be noted that the center of the sheet passing over the plate is eccentric to the bi-sector of the angle at the apex 2c whereby the fold line 20 is spaced closer to one edge of the sheet then it is to the other. This folding arrangement causes the sheet of film to be folded longitudinally with one section 22 overlaying the other section 24 whereby the edge 22a of the one section is spaced inwardly from the edge 24a of the other section forming an outstanding longitudinally extending strip b along the edge 24a of section 24. The strip b does not contact the opposite section 22 in its folded configuration, see FIGS. 5 to 8.

After the folding of the film a is commenced in its path over the plate 2 it passes between the rolls 4, 4 below the apex 2c of the plate and is then positioned in the folded over arrangement as shown in FIG. 5. In this folded over configuration the sheet of film moves upwardly over the support roller 4a and then passes under pressure roller 13 with its strip b contacting the applicator roller 7. Roller 7 is about 10 mm. wide and receives its supply of binder material from the roller 6, which rotates through the reservoir picking up binder material on its circumferential periphery. As the roller 6 passes the doctor blade 14 any excess binder material is removed and then the roller 6 transfers the binder material to the applicator roller 7 which applies it in a narrow band d onto the strip b of the section 24 of the film a. It will be noted that the strip b is on the surface of the section 24 facing toward the section 22 of the film a.

After reeciving the band d of pressure sensitive binder material the sheet of film passes outwardly over the lower support roller 9 and then travels upwardly through the drying chamber 3. Since only the band D on the strip b needs to be dried, only that portion of the sheet of film is passed within the drying chamber, see FIG. 4. During its travel through the drying chamber 3 with the strip b extending inwardly through the slot 8 in the wall of the chamber a stream of hot air is directed by the blower 16 through the heater 15 and the conduit 17 for its upward passage through the drying chamber 3. In addition to affording a drying effect the passage of hot air over the sheet eliminates any undesired folds in the film and is effective in completing the folding operation. After the sheet of film exits from the upper end of the drying chamber 3 it passes over the suport roller 9 at the upper end of the right hand upright 1a of the frame 1, as shown in FIG. 1, and travels across the upper end of the frame to the opposite upright and then passes downwardly over a pair of serially arranged support rollers 9.

At this point the pressure adhering tape c is removed from the roll on the bracket 10 and is superimposed on the band d of pressure-sensitive material located on the strip b of the sheet of film as both pass over the pressure roller 12.

Prior to reaching the roller 12 the binder material has been completely dried. Yet it is adhesive enough in this state than when contacted by another material and by the application of pressure it will provide a seal. From the point of application of the band d of binder material at the applicator roller 7 until it reaches the pressure roller 12 the sheet of film is transported in such a way that nothing comes in contact with the band of binder material. It will be noted from the drawings that the band d faces outwardly away from the rollers over which the sheet of film a is transported and accordingly, there is no problem of any member or material adhering to or disturbing the band d of binder material.

From the pressure roller 12, the combined sheet of film a with its band d of binder material and the superimposed pressure adhering tape c proceed through the rollers 18, 18 which assure that the tape c is securely positioned on the band of binder material and affords protective covering. It will be noted that the tape is of sufficient width to completely cover the band d of binder material, see FIG. 8.

To complete the manufacturing cycle the sheet of film then passes into the side welder-cutter mechanism 19 wherein the sections 22, 24 of the sheet of film a are welded together at spaced location along lines arranged transversely to the longitudinal direction of the sheet and then the welded lines are cut providing individual bags with welded edges as shown in FIG. 8.

After the individual bags are formed, they may be stored without any problem of adjacent bags adhering to one another because of the band d of binder material which has been applied to the strip b.

When the bags are ready to be used, the section of pressure adhering tape c is removed from the band d of pressure-sensitive binder material and the strip is folded over so that it overlays the edge 22a of the other section 22, of the sheet of film a and provides a seal. The bag may be reused a number of times since the pressure-sensitive binder material does not lose its adhesiveness.

The present invention provides a particularly desirable manner of manufacturing the bags since they are constructed in a simple manner and, though provided with a resealable flap, there is no problem of the bags sticking together during the manufacturing process or during storage prior to use since the pressure adhering tape pevents any sticking to adjacent bags or other material.

While a single embodiment of the apparatus for carrying out the present invention has been illustrated and described in, it will be appreciated that the various elements making up the apparatus can be arranged in a different form or different elements may be used without departing from the basic concept of the invention.

While a specific embodiment of the invention has been shown and described in detail to illustrate the application of the inventive principles, it will be understood that the invention may be embodied otherwise without departing from such principles.

What is claimed is:

1. A method of manufacturing bags from a continuous longitudinally extending sheet of thermoplastic resin film comprising the steps of passing the film along a longitudinal path of travel, folding the film over upon itself into two sections along a longitudinally extending fold line whereby one section of the film overlaps the other with its edge extending outwardly a sufficient distance beyond the edge of the other section for forming an outwardly extending strip therealong, continuously applying a band of pressure-sensitive binder material to the outwardly extending strip on the surface thereof so that when folded over it contacts the other section, passing at least that portion of the one section of the film having a band of pressure-sensitive binder material thereon in the longitudinal direction through a drying space, supplying a drying medium to the drying space, superimposing a removable pressure-adhering tape on the band of binder material for completely covering the band after it has been dried, transporting the film after the application of the pressure-sensitive binder material to the location at which the pressure-adhering tape is applied thereon for preventing contact between the band of binder material and any other surface and providing a sufficient longitudinal distance of travel for the film in combination with the drying step for completely drying the pressure-sensitive binder material before the pressure-adhering tape is imposed thereon, welding the folded over sections of film together at spaced locations along lines spaced substantially perpendicularly to the longitudinal path of travel of the film, and cutting the film along the welded lines for forming individual bags whereby the outwardly extending strips with the pressure-adhering tape removed from the pressure-sensitive binder material form resealable flaps for the bags.

2. A device for making bags from a continuous longitudinally extending sheet of thermoplastic resin film comprising means arranged for folding a sheet of film along a longitudinally extending fold line with one section thereof overlapping the other section whereby the edge of said one section extends outwardly from the edge of said other section forming a strip along the edge of said one section disposed out of contact with said other section in the overlapping arrangement, means arranged for applying a band of pressure-sensitive binder material along one surface of said strip of said one section of the film so that when said strip is folded over into contact with said other section said band of pressure-sensitive binder material contacts said other section, a longitudinally extending drying chamber having a longitudinally extending slot therein arranged to receive at least the strip portion of the folded sheet of film after the application of the band of binder material thereon, means for supplying a drying medium to said chamber, means arranged to superimpose a removable pressure-adhering tape to the band of pressure-sensitive material for completely covering the pressure-sensitive binder material, means for transporting the folded sheet of film from the location at which the band of pressure-sensitive binder material is applied to said means for superimposing the pressure-adhering tape so that the band of pressure-sensitive binder material is maintained out of contact with any other surface and arranging said drying chamber and means for transporting the film so that the band of pressure-sensitive material is completely dried before the pressure-adhering tape is applied, and means arranged to weld the overlapping sections of the sheet of film together at spaced locations along lines disposed substantially perpendicularly to the longitudinal path of travel of the film and for cutting the sheet of film along the welded lines for forming individual bags whereby the strip of said one section of the film can be displaced in overlapping relationship along the edge of said other section for forming cover flaps for the bag and after removal of said pressure-adhering tape from said band of pressure-sensitive binder material the cover flap can be adhered to said other section.

3. A device, as set forth in claim 2, wherein means forming a frame, said means for forming the sheet of film comprises a plate member supported on said frame and disposed at an angle to the vertical, said plate member having a pair of opposite sides arranged in downwardly converging relationship meeting at an apex at the lower end thereof, a pair of horizontally arranged rollers forming a nip closely aligned below the apex of the plate member and arranged to receive the sheet of film in said nip from the apex of said plate member for completing the folding of said sheet.

4. A device, as set forth in claim 2, wherein said drying chamber comprising longitudinally extending walls formed to provide a C-shaped transverse cross section wherein the opening in the C-shaped section forms said longitudinally extending slot, and said means for supplying a drying medium to said chamber comprising a conduit member in communication with said drying chamber at the end thereof forming the inlet for the sheet of film, a blower located within said conduit, and a heater disposed in said conduit and arranged to heat a supply of air from said blower for passage through said conduit into said drying chamber.

References Cited

UNITED STATES PATENTS

| | | | |
|---|---|---|---|
| 2,755,576 | 7/1956 | Golden. | |
| 3,348,762 | 10/1967 | Kasinkas | 229—66 XR |
| 3,361,041 | 1/1968 | Grub | 93—35 XR |

BERNARD STICKNEY, Primary Examiner

U.S. Cl. X.R.

93—35; 229—62